United States Patent Office 3,329,655
Patented July 4, 1967

3,329,655
OXYALKYLATED MELAMINE - FORMALDEHYDE CONDENSATES AND METHOD FOR THEIR PREPARATION
William D. Emmons, Huntingdon Valley, and James P. Shelley, Drexel Hill, Pa., assignors to Rohm & Haas Company, Philadelphia, Pa., a corporation of Delaware
No Drawing. Filed Jan. 31, 1964, Ser. No. 341,743
8 Claims. (Cl. 260—67.6)

The present invention is concerned with novel oxyalkylated melamine-formaldehyde condensates and methods for preparing them. It is particularly concerned with such condensates which have improved stabilities and in use, particularly in connection with textiles, are characterized by greatly improved resistance to chlorine damage.

It has heretofore been proposed to treat methylolmelamines such as hexamethylol melamine with an alkylene oxide such as ethylene oxide in French Patent 879,551 and Swiss Patents 227,351 and 230,185. The products obtained in these patents suffer from one or more disadvantages such as dark color, susceptibility of textiles treated therewith to severe damage on chlorination in bleaching, limited water tolerance and/or lack of stability in aqueous solution.

U.S. Patent 2,594,452 has also proposed the addition of an alkylene oxide to methylol melamines or their ether derivatives but the products obtained are characterized by imparting to textiles treated therewith serious susceptibility to damage on chlorination as in bleaching.

It is an object of the present invention to provide improved oxyalkylated melamine-formaldehyde condensates which show far less susceptibility to chlorine damage when applied to textiles in conjunction with improved water tolerance and better stability in aqueous media. Other objects and advantages of the present invention will be apparent from the description hereinafter.

The condensates of the present invention are obtained by a process comprising at least three stages involving a preliminary methylolation of melamine, reaction of the resulting product with an alkylene oxide having 2 to 3 carbon atoms, and then further condenstation of the oxyalkylated product with formaldehyde. Of course, the initial stage referred to may be omitted if there is available as a starting material for the second stage an appropriate melamine-formaldehyde condensate containing about 1.5 to about 4.5 moles of formaldehyde combined in the melamine-formaldehyde condensate. For example, dimethylol melamine, trimethylol melamine, or tetramethylol melamine may be employed as the starting materials for the alkylation which is subsequently followed by additional reaction with formaldehyde.

The initial melamine-formaldehyde condensate to be used as the starting material for the reaction with the alkylene oxide may be obtained in conventional manner by reacting about 1.5 moles to about 4.5 moles of formaldehyde with melamine at a pH of 6 to 10.5, preferably about 9 to 10, and at a temperature of about 30 to 120° C., preferably 80 to 110° C., in an aqueous medium. For example, the commercially available 37% formaldehyde solution may be mixed with the melamine in the desired proportion, the mixture being adjusted to the desired pH in the range specified hereinabove such as by means of caustic soda and the temperature being raised to the range specified. A closed autoclave adapted to operate under pressure may be employed for the reaction especially if temperatures above the boiling point of water are to be used. Reaction may be carried out at any pressure from atmospheric up to 50 lbs. per square inch (p.si.) or higher. Any suitable source of formaldehyde may be employed such as para-formaldehyde or other formaldehyde polymers which liberate the formaldehyde under the reaction conditions specified. The particular concentration of the reactants in the reaction medium is not critical, it being only necessary that a small amount of water be present. In the case of para-formaldehyde, the amount of water normally absorbed and present in this reactant is adequate though for most purposes additional water may be supplied.

It is essential that at least 1.5 moles of formaldehyde be combined per mole of melamine in order to provide adequate solubility to favor the subsequent reaction with the alkylene oxide. However, in accordance with the present invention, it is essential that the maximum amount of formaldehyde combined with the melamine be no greater than about 4.5 moles. The combination of appreciably more than 4.5 moles of formaldehyde per mole of melamine interferes with the subsequent reaction with the alkylene oxide, slowing it down and yielding a product lacking in the advantageous properties obtainable when following the procedure of the present invention as set out.

The melamine-formaldehyde condensate containing about 1.5 to 4.5 moles of formaldehyde per mole of melamine (whether prepared specifically for this purpose or obtained from available commercial sources) is then reacted with an alkylene oxide having 2 to 3 carbon atoms, such as ethylene oxide or propylene oxide or a mixture thereof in any desired proportions. The melamine-formaldehyde condensate to be oxyalkylated is supplied to this stage in an aqueous medium which may have any desired concentration, but for most practical purposes is generally in the range of about 10 to 60% by weight concentration. The melamine-formaldehyde condensate solution is adjusted to a pH of 8 to 10.5 if it is not already in that range by the addition of suitable alkaline agents such as caustic soda, caustic potash, and the like. Preferably the pH initially is about 9 to 10, and the alkylene oxide is supplied to the solution maintained at a temperature from room temperature to 120° C., but preferably in the range of about 50 to 85° C. The alkylene oxide can be run through or introduced into the melamine-formaldehyde solution at atmospheric pressure or it may be suppiled thereto while the aminoplast is maintained under pressure in the closed reaction vessel or autoclave. The pressure may be very low such as about 1 lb. per square inch, or it may be maintained as high as 50 to 100 lbs. per square inch. The alkylene oxide is added until about 1.5 to 4 moles thereof is reacted with the melamine-formaldehyde condensate, the minimum amount of alkylene oxide in any case being sufficient to render the product water-soluble over extended periods of time and stable against crystallization for periods of at least two weeks to several months. In general, if the proportion of formaldehyde combined in the melamine-formaldehyde condensate is in the lower part of the range specified hereinabove, a proportion of alkylene oxide in the upper portion of the range specified therefor is generally desirable or, in some cases, even necessary to provide adequate water-solubility and tolerance. On the other hand, if a larger proportion of formaldehyde is present, a smaller proportion of alkylene oxide may be needed.

The oxyalkylated condenstate thereby obtained is then reacted with additional formaldehyde or source of formaldehyde to assure that the total amount of formaldehyde combined with melamine including that introduced in the initial reaction of formaldehyde and that reacted in this subsequent stage amounts to at least 5 moles per mole of melamine. In general, the preferred proportion of total combined formaldehyde is approximately 6 moles per mole of melamine. Thus, if in the first stage of reaction of the melamine with formaldehyde, 1.5 moles of the latter was combined in the melamine, the subsequent stage of reaction introduces at least 3.5, and preferably about 4.5 moles of formaldehyde per mole of melamine. During this reaction, an excess of the formaldehyde over the amount desired to be combined into the condensate may be used, but it is generally unnecessary. The reaction conditions for this stage of the condensation procedure may be the same as those employed in the preparation of the initial melamine-formaldehyde condensate. On the other hand, the reactions may in a specific instance, be different than those employed in the first stage. In general, however, they fall in the same range of conditions as set out generally hereinbefore for the initial reaction of the melamine with formaldehyde.

The condensates prepared as just described canced be further modified by reaction with an epihalohydrin, such as epichlorohydrin or epibromohydrin. This reaction with the epihalohydrin may be effected before or after the final step of condensation with formaldehyde as just described. Preferably the reaction with epihalohydrin is carried out whenever it is to be employed after the final stage of condensation with formaldehyde. The proportion of epihalohydrin that may be thus employed may be from about 0.1 to 2 moles of the epihalohydrin per mole of melamine combined in the condensate. The preferred proportion is about 0.5 to about 1.0 mole per mole of melamine. Even the employment of 0.1 to 0.5 mole of the epihalohydrin per mole of melamine condensate is adequate to noticeably improve many of the condensation products of the present invention in respect to their stability, especially in retarding any tendency of the aqueous solutions thereof to form deposits such as of crystalline materials on standing in storage under normal conditions of temperature and pressure. The reaction with the epihalohydrin is effected at a temperature of about 50 to 100° C. over a period of about ¼ of an hour to 5 hours or more. Generally, a temperature of 60–80° C. is preferred, and the epihalohydrin is ordinarily added gradually to the oxyalkylated melamine-formaldehyde condensate so as to maintain the temperature below 100° C., and in the preferred instance below 80° C. The period of addition may vary from ¼ of an hour to an hour or so, depending upon the size of the batch and quantity of epihalohydrin to be mixed. After the epihalohydrin is mixed into the condensate, further reaction may be effected by holding the mixture in the desired reaction temperature range for a period of 2 to 4 hours.

If desired, the reaction product of the last stage may be etherified with alcohols or glycols such as methyl alcohol, ethyl alcohol, isopropyl alcohol, and any of the butyl alcohols. Water-soluble products are still obtained when ethylene glycol or methanol are employed for the etherification. More or less water-insoluble products are obtained with the higher alcohols such as ethanol, propanol, or butanol. In any case, the etherification may be partial or complete as desired. The etherification is generally carried out by adding an alcohol or glycol to the aqueous solution of the condensate, adjusting the pH to about 2 to 4 with an acid, and then heating to reflux temperature under ordinary atmospheric conditions.

The unetherified condensation products of the present invention are the preferred products, and if desired, they can be aged under acid conditions such as a pH of 1.5 to 3.5 (obtainable by adjustment of hydrochloric acid) by allowing them to stand for a period of one or two days at room temperature while maintained at a concentration of about 10 to 15%. Such ageing builds up the molecular weight and produces a colloidal solution of the condensate of higher molecular weight. Such aged materials are particularly useful for the impartation of wet strength to paper.

The products of the present invention are useful for a wide variety of purposes. Thus, in the textile field they may be used for the creaseproofing of cellulosic textiles, the shrinkproofing of wool, the bonding of non-woven fabrics, the sizing and stiffening of textiles, imparting wet strength to paper, as laminating adhesives for adhering layers of various materials together, and especially of wood in the making of plywood, of cellulosic plastics in the making of laminated plastic materials, of glass in the making of safety glass, and textile fabrics, especially of cellulosic, proteinaceous or polyamide types.

While in general the condensation products of the invention do not lend themselves to a clear-cut definition of their composition because of the possibility of varying the proportions of formaldehyde, alkylene oxide, and melamine, nevertheless, one of the preferred products obtained by reaction of a trimethylol melamine with three moles of ethylene oxide (per mole of melamine) followed by reaction with an additional three moles of formaldehyde (per mole of melamine) may comprise as a major component in the composition a compound of the formula

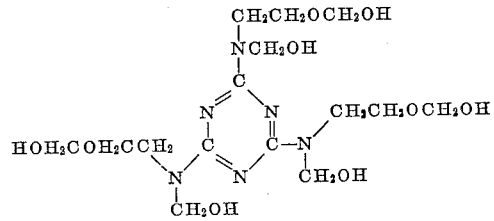

It is to be noted that the $\beta$-hydroxyethyl substituents on each of the three amino nitrogen atoms are represented as having been converted to a hemiformal by reaction with the additional formaldehyde. It is to be understood, however, that this is only one of the possible components in the mixture which constitutes the condensation product obtained after the formaldehyde reaction step following the oxyalkylation. A similar preferred product is obtained when the ethylene oxide is replaced with propylene oxide

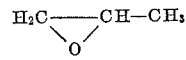

However, it is not intended that the invention be limited to any particular theory as to the exact composition of the products obtained.

In the following examples which are illustrative of the present invention, the parts and percentages are by weight unless otherwise indicated.

EXAMPLE 1(a)

*Material charge*

| | Mol. |
|---|---|
| A. 802.0 gm. aqueous formaldehyde (36.5%) | 9.75 |
| B. 4.0 ml. 50% NaOH. | |
| C. 378.0 gm. melamine | 3.0 |
| D. 432.0 gm. ethylene oxide | 9.75 |
| E. 802.0 gm. aqueous formaldehyde (36.5%) | 9.75 |

*Equipment*

Two-liter pressure vessel or autoclave fitted with thermometer, stirrer and heating mantle; a gas-charging tank adapted to be connected to the pressure vessel and a three-liter, three-neck glass reaction vessel equipped with thermometer, stirrer and reflux condenser.

*Procedure*

Material A was charged to the pressure vessel and adjusted by the addition of material B to a pH of 9.7 (glass electrode—hereinafter referred to as G.E.) Material C was then added and the mixture heated over a period of about a half hour till it reached 70° C. At this point, material D in the gas-charging tank was charged to the pressure vessel at such a rate as to maintain a pressure of less than 30 p.s.i. and to hold the batch temperature between 70 to 75° C. When D had been charged and the reaction had been completed (determined by drop in pressure to 0–5 p.s.i. (the batch was cooled to room temperature and transferred to the glass reaction vessel and material E was added. This reaction mixture was heated to 70–80° C. and held at this temperature for eight hours. It was then cooled and its constants were determined.

*Physical constants*

| | |
|---|---|
| Solids | percent__ 48.6 |
| Viscosity (Gardner-Holdt) | A— |
| pH (G.E.) | 8.6 |
| Water tolerance | Infinite |

EXAMPLE 1(b)

The solution obtained in part (a) hereof was diluted to a concentration of 5% solids, then 0.2 N acetic acid was added to adjust the pH to 7.0, and 1.4% by weight, based on the total weight of the solution, of oxalic acid was added. A cotton broadcloth fabric was impregnated with the solution in a textile pad controlled to provide 100% wet pickup. The impregnated fabric was then cured by heating 10 minutes at 150° C. The warp crease recovery was measured (Shirley Creaserecovery Tester) and found to be 115° (wet) and 118° (dry). Chlorine damage determined by the AATCC Test was only about 8% loss of tensile strength.

EXAMPLE 2

The procedure of Example 1(a) was followed, except that in the first stage of the reaction, the amount of Material A was increased to 1115 g. (13.5 moles of formaldehyde), the amount of ethylene oxide was reduced to 333 g. (7.5 moles), and the amount of Reagent E was 372 g. (4.5 moles formaldehyde).

The product was diluted to 12% solids with acidified (HCl) water, then adjusted to a pH of 3.0, and aged at this pH for 3 hours. The condensate was then diluted to 6% solids, aged overnight at room temperature, and then diluted to 2% solids.

20 cc. of the 2% solution thereby obtained was added to 1.9 liters of a 2% bleached sulfite pulp beaten to a Canadian Freeness of 460 ml. The pulp was adjusted to a pH of 4 by the addition of sulfuric acid, and after dilution to a consistency of 0.03 pulp solids, was cast into a paper sheet which was then dried at 93° C. for 2 minutes. After conditioning the dried sheet overnight at 23° C. and 50% relative humidity, the wet tensile strength was measured three days after formation of the sheet, ten days thereafter, and thirty-five days thereafter. The wet tensile strength in kg./cm. width was 8.0 after three days, 9.2 after ten days, and 9.8 after thirty-five days.

EXAMPLE 3

*Material charge*

| | | Mol. |
|---|---|---|
| A. 802.0 gm. aqueous formaldehyde (36.5%) | | 9.75 |
| B. 4.0 gm. 50% NaOH. | | |
| C. 378.0 gm. melamine | | 3.0 |
| D. 264.0 gm. ethylene oxide | | 6.0 |
| E. 802.0 gm. aqueous formaldehyde (36.5%) | | 9.75 |

The processs of Example 1 was repeated except the materials charged were as indicated immediately above. The product was similar to that obtained in Example 1(a).

EXAMPLE 4

*Material charge*

| | | Mol. |
|---|---|---|
| A. 369.0 gm. aqueous formaldehyde (36.5%) | | 4.5 |
| B. 2.0 ml. 50% NaOH. | | |
| C. 378.0 gm. melamine | | 3.0 |
| D. 432.0 gm. ethylene oxide | | 9.75 |
| E. 1218.0 gm. aqueous formaldehyde (36.5%) | | 15.0 |

The process of Example 1 was repeated except the materials charged were as indicated immediately above. The product was similar to that obtained in Example 1(a).

EXAMPLE 5(a)

*Material charge*

| | | Mol. |
|---|---|---|
| A. 738.0 gm. aqueous formaldehyde (36.5%) | | 9.0 |
| B. 4.0 ml. 50% NaOH. | | |
| C. 378.0 gm. melamine | | 3.0 |
| D. 330.0 gm. ethylene oxide | | 7.5 |
| E. 738.0 gm. aqueous formaldehyde (36.5%) | | 9.0 |
| F. 138.8 gm. epichlorohydrin | | 1.5 |

Material A was charged to the pressure vessel and adjusted with B to a pH=9.5 (G.E.), C was then added and the mixture heated (over a half-hour period) to approximately 70° C. At this stage D was charged to the pressure vessel at such a rate as to maintain a batch pressure of less than 30 p.s.i. and to hold pot temperature between 70 to 75° C. After D had been charged and the reaction had been completed (as determined by pressure drop to 5–0 p.s.i.) the batch was cooled to room temperature and was transferred to the glass reaction vessel along with E. The reaction mixture was heated to 70–80° C. and held at this temperature for eight hours. At the end of this eight-hour period while still maintaining the 70–80° C. temperature, F was charged (dropwise) over a period of about 20 minutes and heating continued for another three to four hours.

The product had a solids content of about 51%, a pH of about 8, a Gardner-Holdt viscosity of B, and was completely miscible with water.

EXAMPLE 5(b)

The solution obtained in part (a) hereof was diluted to a concentration of 5% solids and 0.2 N acetic acid was added to adjust the pH to 4.0. Then 1.4% by weight, based on the total solution weight, of zinc nitrate, was added, and a cotton broadcloth fabric was impregnated with the solution in a textile pad controlled to provide 100% wet pickup. The impregnated fabric was then cured by heating 10 minutes at 150° C. The warp crease recovery was measured (Shirley Creaserecovery Tester) and found to be 106° (wet) and 122° (dry). Chlorine damage determined by the AATCC Test was only about 5% loss of tensile strength.

EXAMPLE 6

*Material charge*

| | | Mol. |
|---|---|---|
| A. 802.0 gm. aqueous formaldehyde (36.5%) | | 9.75 |
| B. 4.0 ml. 50% NaOH. | | |
| C. 378.0 gm. melamine | | 3.0 |
| D. 522.0 gm. propylene oxide | | 9.0 |
| E. 802.0 gm. aqueous formaldehyde (36.5%) | | 9.75 |

Material A was charged to a glass reaction vessel and its pH was adjusted to about 9.5 by the addition of Material B. Material C was then added and the mixture was heated over a period of about ½ hour until it reached the temperature 70° C. Then Materal D was charged to the reaction product at such a rate as to hold the batch temperature between about 70 and 77° C. The temperature was maintained at about 75° C. for an hour after the completion of the charge. The material E was then charged to the batch in the reaction vessel while maintaining the reaction mixture at a temperature of 70–80° C. The mixture was held in this temperature range for about 8 hours. The resulting product was completely water-miscible, had a solids content of about 46% and a pH of 8.5.

EXAMPLE 7

*Material charge*

| | | Mol. |
|---|---|---|
| A. 648.0 gm. trimethylol melamine | | 3.0 |
| B. 648.0 gm. water. | | |
| C. 432.0 gm. ethylene oxide | | 9.75 |
| D. 802.0 gm. aqueous formaldehyde (36.5%) | | 9.75 |

Equipment

Same as in Example 1.

Procedure

A and B were charged to a pressure vessel and the mixture was heated to 70° C. When the batch temperature reached 70° C., C was charged at such a rate as to maintain a batch temperature between 70–75° C. and a batch pressure of less than 30 p.s.i. After the reaction with C was complete (determined by pressure drop of the batch to 5–0 p.s.i.), the mixture along with D was charged to a three-liter, three-neck glass reaction vessel, heated to 70–80° C. and held at this temperature for four hours.

EXAMPLE 8

Fabrics of cotton broadcloth were impregnated with oxalic acid and the compositions of Examples 2, 3, 4, 6, and 7 by the procedure of Example 1(b). After curing in the same fashion, good creaseproofing results were obtained.

We claim:
1. A process for producing an aminoplast condensation product which comprises mixing at least one alkylene oxide having 2 to 3 carbon atoms with an aqueous solution, having a pH of about 8 to 10.5 and a temperature in the range from room temperature to 120° C., under conditions of pressure in the range of atmospheric to superatmospheric to maintain the solution below its boiling point, of a melamine-formaldehyde condensate containing combined with the melamine about 1.5 to 4.5 moles of formaldehyde per mole of melamine, the amount of the alkylene oxide added and thereby chemically combined with the melamine-formaldehyde condensate being about 1.5 to 4 moles per mole of melamine, and then reacting the resulting oxyalkylated condensate with additional formaldehyde by mixing the formaldehyde with an aqueous solution of the oxyalkylated condensate at a pH of about 6 to 10.5 and a temperature of 30 to 120° C. to introduce sufficient additional combined formaldehyde to provide a total of at least 5 moles thereof per mole of melamine in the condensate.

2. A water-soluble oxyalklated condensation product obtained by the process of claim 1.

3. A process for producing an aminoplast condensation product which comprises mixing at least one alkylene oxide having 2 to 3 carbon atoms with an aqueous solution, having a pH of about 8 to 10.5 and a temperature in the range from room temperature to 120° C., under conditions of pressure in the range of atmospheric to superatmospheric to maintin the solution below its boiling point, of a melamine-formaldehyde condensate containing combined with the melamine about 1.5 to 4.5 moles of formaldehyde per mole of melamine, the amount of the alkylene oxide added and thereby chemically combined with the melamine-formaldehyde condensate being about 1.5 to 4 moles per mole of melamine, reacting the resulting oxyalkylated condensate with additional formaldehyde by mixing the formaldehyde with an aqueous solution of the oxyalkylated condensate at a pH of about 6 to 10.5 and a temperature of 30 to 120° C. to introduce sufficient additional combined formaldehyde to provide a total of at least 5 moles thereof per mole of melamine in the condensate, mixing epichlorohydrin with the resulting condensate, in a proportion of about 0.1 to 2 moles of the epichlorohydrin per mole of melamine in the condensate, and heating the mixture at 50° to 100° C. to effect reaction of the hydrin with the condensate.

4. A water-soluble oxyalkylated condensation product obtained by the process of claim 3.

5. A process for producing an aminoplast condensation product which comprises mixing ethylene oxide with an aqueous solution having a pH of about 8 to 10.5 and a temperature in the range from room temperature to 120° C. under superatmospheric pressure to maintin the solution below its boiling point, of a melamine-formaldehyde condensate containing combined with the melamine about 1.5 to 4.5 moles of formaldehyde per mole of melamine, the amount of ethylene oxide added and thereby chemically combined with the melamine-formaldehyde condensate being about 1.5 to 4 moles per mole of melamine, and then reacting the resulting oxyethylated condensate with additional formaldehyde by mixing the formaldehyde with an aqueous solution of the oxyethylated condensate at a pH of about 6 to 10.5 and a temperature of 30° to 120° C. to introduce sufficient additional combined formaldehyde to provide a total of at least 5 moles thereof per mole of melamine in the condensate.

6. A water-soluble oxyethylated condensation product obtained by the process of claim 5.

7. A process for producing an aminoplast condensation product which comprises mixing propylene oxide with an aqueous solution, having a pH of about 8 to 10.5 and a temperature in the range from room temperature to 120° C. under superatmospheric pressure to maintain the solution below its boiling point, of a melamine-formaldehyde condensate containing combined with the melamine about 1.5 to 4.5 moles of formaldehyde per mole of melamine, the amount of propylene oxide added and thereby chemically combined with the melamine-formaldehyde condensate being about 1.5 to 4 moles per mole of melamine, and then reacting the resulting oxypropylated condensate with additional formaldehyde by mixing the formaldehyde with an aqueous solution of the oxypropylated condensate at a pH of about 6 to 10.5 and a temperature of 30° to 120° C. to introduce sufficient additional combined formaldehyde to provide a total of at least 5 moles thereof per mole of melamine in the condensate.

8. A water-soluble oxypropylated condensation product obtained by the process of claim 7.

References Cited

UNITED STATES PATENTS

| | | | |
|---|---|---|---|
| 2,594,452 | 4/1952 | Kosmin | 260—67.6 |
| 2,769,798 | 11/1956 | Meis et al. | 260—45.8 |
| 2,915,502 | 12/1959 | Albrecht | 260—67.6 |
| 3,053,798 | 9/1962 | D'Alelio | 260—835 |

FOREIGN PATENTS

| | | |
|---|---|---|
| 879,551 | 2/1943 | France. |

SAMUEL H. BLECH, *Primary Examiner.*

WILLIAM H. SHORT, *Examiner.*

H. S. CHAIN, *Assistant Examiner.*